US006777892B2

(12) United States Patent
Huber et al.

(10) Patent No.: US 6,777,892 B2
(45) Date of Patent: Aug. 17, 2004

(54) DEVICE FOR CONTROLLING OPERATING MEANS FOR AT LEAST ONE ELECTRIC ILLUMINATING MEANS AND A METHOD FOR CONTROLLING OPERATING MEANS FOR AT LEAST ONE ELECTRIC ILLUMINATING MEANS

(75) Inventors: Andreas Huber, Traunreut (DE); Axel Pilz, Neuenstein (DE)

(73) Assignee: Patent-Treuhand-Gesellschaft fur Elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/169,775
(22) PCT Filed: Jan. 12, 2001
(86) PCT No.: PCT/DE01/00148
  § 371 (c)(1),
  (2), (4) Date: Jul. 9, 2002
(87) PCT Pub. No.: WO01/52607
  PCT Pub. Date: Jul. 19, 2001

(65) Prior Publication Data
  US 2003/0030384 A1 Feb. 13, 2003

(30) Foreign Application Priority Data
  Jan. 14, 2000 (DE) .......................... 100 01 241

(51) Int. Cl.[7] ................................................ G05F 1/00
(52) U.S. Cl. ...................... 315/291; 315/292; 315/312; 315/316; 315/DIG. 4
(58) Field of Search ................................ 348/558, 560, 348/555, 556, 554, 553; 315/291, 292–297, 307, 312, 316, 149, 150, 159, 324, DIG. 4, DIG. 5

(56) References Cited

U.S. PATENT DOCUMENTS

| 4,968,917 | A | | 11/1990 | Harris .......................... 315/77 |
| 5,339,009 | A | | 8/1994 | Lai ............................. 315/291 |
| 5,544,037 | A | | 8/1996 | Luger ......................... 364/146 |
| 6,317,168 | B1 | * | 11/2001 | Seo ............................. 348/725 |
| 6,353,463 | B1 | * | 3/2002 | Seo ............................. 348/731 |
| 6,369,857 | B1 | * | 4/2002 | Balaban et al. ............. 348/555 |
| 6,501,510 | B1 | * | 12/2002 | Moon ......................... 348/553 |
| 6,567,132 | B1 | * | 5/2003 | Groff et al. ................. 348/723 |

FOREIGN PATENT DOCUMENTS

| DE | 197 57 295 | 12/1997 |
| DE | 298 11 633 | 9/1998 |
| EP | 0 714 224 | 5/1996 |
| EP | 0 821 547 | 1/1998 |

* cited by examiner

Primary Examiner—Tuyet T. Vo

(57) ABSTRACT

The invention relates to a device (C, C') for controlling operating means (3, 3') for at least one electric illuminating means (4, 4'). The inventive device comprises an input (8a, 8b, 8a', 8b') for receiving control signals from an external control device (7) and an evaluating means (9, 9') that is suitable to detect analogous and digital control signals on the input (8a, 8b, 8a', 8b') for control signals and to evaluate said signals for controlling operating means (3, 3') for the illuminating means (4, 4'). The invention also relates to a method for controlling the operating means (3, 3') for electric illuminating means (4, 4') by means of analogous or digital control signals. In an advantageous embodiment, the inventive device (C, C') is a component of an operating device (B, B') for electric illuminating means (4, 4').

6 Claims, 5 Drawing Sheets

Figure 1:
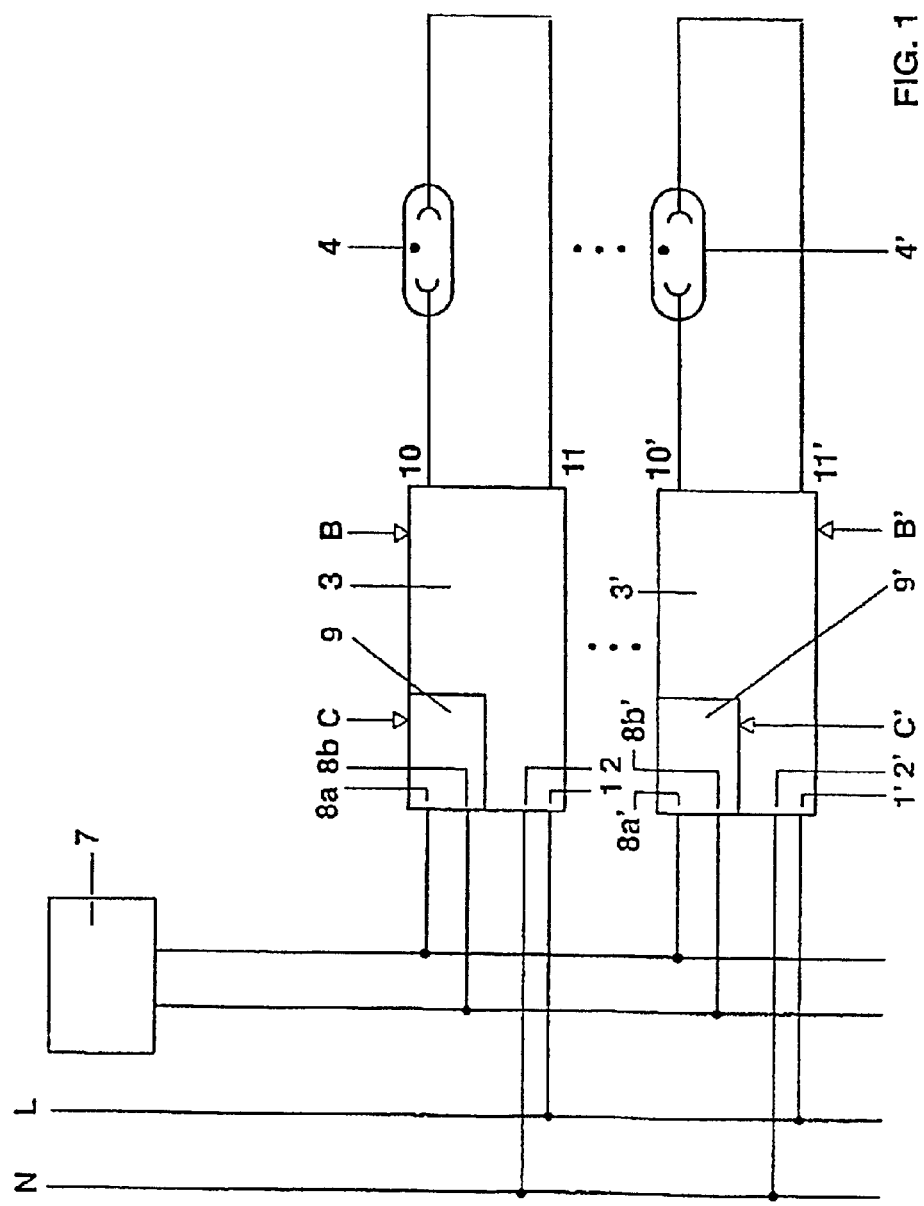

DEVICE FOR CONTROLLING OPERATING MEANS FOR AT LEAST ONE ELECTRIC ILLUMINATING MEANS AND A METHOD FOR CONTROLLING OPERATING MEANS FOR AT LEAST ONE ELECTRIC ILLUMINATING MEANS

I. TECHNICAL FIELD

The invention relates to a device for controlling operating means for at least one electric illuminating means, and to a method for controlling operating means for at least one electric illuminating means. The term electric illuminating means denotes both electric lamps such as, for example, incandescent lamps or discharge lamps, and light-emitting diodes.

II. BACKGROUND ART

The Laid-Open Specification EP 0 639 938 A1 describes a control device for consumers combined in groups. These consumers are, in particular, operating devices for electric lamps that have a device in accordance with the preamble of patent claim 1, and operating means for at least one electric lamp. These operating devices have a control signal input via which control signals can be applied to them by means of the control device in order to implement different illuminating scenarios. Digital control signals are required to control the operating devices.

III. DISCLOSURE OF THE INVENTION

It is the object of the invention to provide a device for controlling operating means for at least one electric illuminating means and which can optionally be driven via the same control signal input with the aid of digital or analog control signals, and to specify a method for controlling the operating means for at least one electric illuminating means and which permits the operating means to be controlled optionally at the same control signal input with the aid of digital or analog control signals.

This object is achieved for a generic device according to the invention by means of the features of patent claim 1, and for the method according to the invention by means of patent claim 7. Particularly advantageous features of the invention are described in the subclaims.

The device according to the invention has evaluating means that are suitable for automatically detecting both analog and digital control signals at the control signal input of the device, and for evaluating them for the purpose of controlling the operating means for the illuminating means. The device according to the invention can therefore be used both in lighting systems that are fitted with central control devices for generating analog control signals, and in lighting systems that are provided with central control devices for generating digital control signals. Moreover, the user need not think about the correct connection of the device according to the invention to the control device, since the same control signal input of the device according to the invention is used for the analog and for the digital control of the operating means by the control device. Furthermore, the user can also optionally decide on the use of an analog or digital control device in the lighting system subsequently, that is to say after the device according to the invention and the operating means have been installed in the lighting system. The evaluating means advantageously include a program-controlled microcontroller or a logic circuit. The device according to the invention is advantageously a component of an operating device for electric illuminating means that has operating means for at least one illuminating means. However, it is also possible to arrange the device according to the invention outside an operating device for electric illuminating means, and to provide signal transmitting means, for example cables, between the device according to the invention and the operating means, arranged inside the operating device, for the at least one electric illuminating means.

The method according to the invention for controlling operating means for at least one electric illuminating means with the aid of control signals, generated by an external control device, and of a device that has a control signal input for receiving the control signals and also evaluating means for evaluating the control signals and for controlling the operating means comprises the following method steps:

applying a control signal to the control signal input and transmitting the control signal to the evaluating means, automatically testing the control signal with the aid of the evaluating means as to whether the control signal forms a valid digital control signal or a valid analog control signal or an invalid signal, and evaluating the control signal and appropriately controlling the operating means with the aid of the evaluating means if a valid digital or analog control signal is present.

The method according to the invention permits optional control of the operating means of the illuminating means of an lighting system by means of analog or digital control signals that are generated by a central control device of the lighting system in order to control the lighting functions. Moreover, independently of whether they are analog or digital, the control signals can be fed to the same control signal input of each device according to the invention or each operating device that contains the device according to the invention. The devices or operating devices therefore do not require separate control signal inputs for analog and digital signals. In the case of an analog drive of the devices or operating devices, use is advantageously made as analog control signal of a periodic AC voltage whose peak value exceeds a prescribable threshold value representing the minimum permissible high level for digital control signals, and which assumes at least once per period a value below a prescribable second threshold value that represents the maximum permissible low level for digital control signals. It is even possible in the case of such analog control signals to use a single pushbutton for controlling the devices according to the invention or operating devices of the lighting system. The method according to the invention further permits additional control of the devices or operating devices at the same control signal input by means of a constant light regulation device.

IV. BRIEF DESCRIPTION OF THE DRAWINGS

Figure 2:
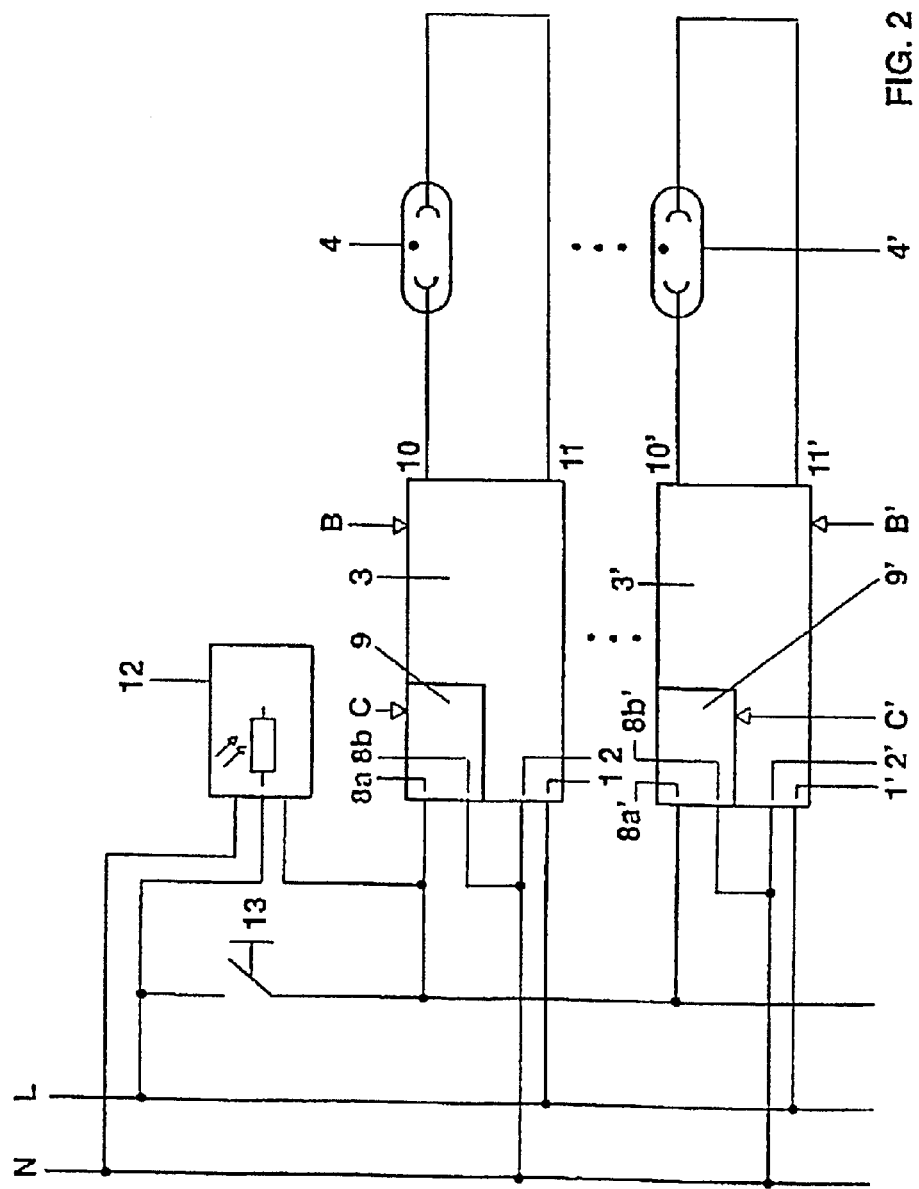
Figure 3:
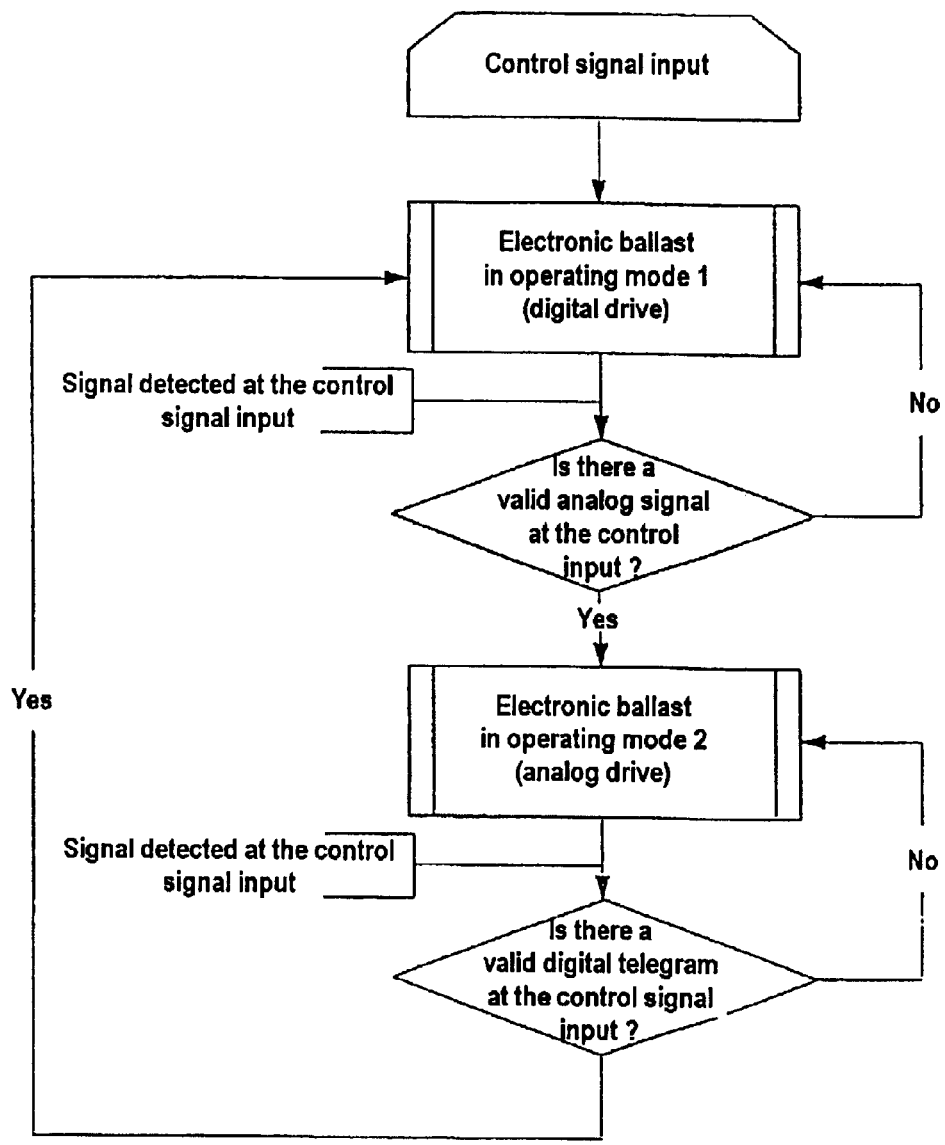
Figure 4:
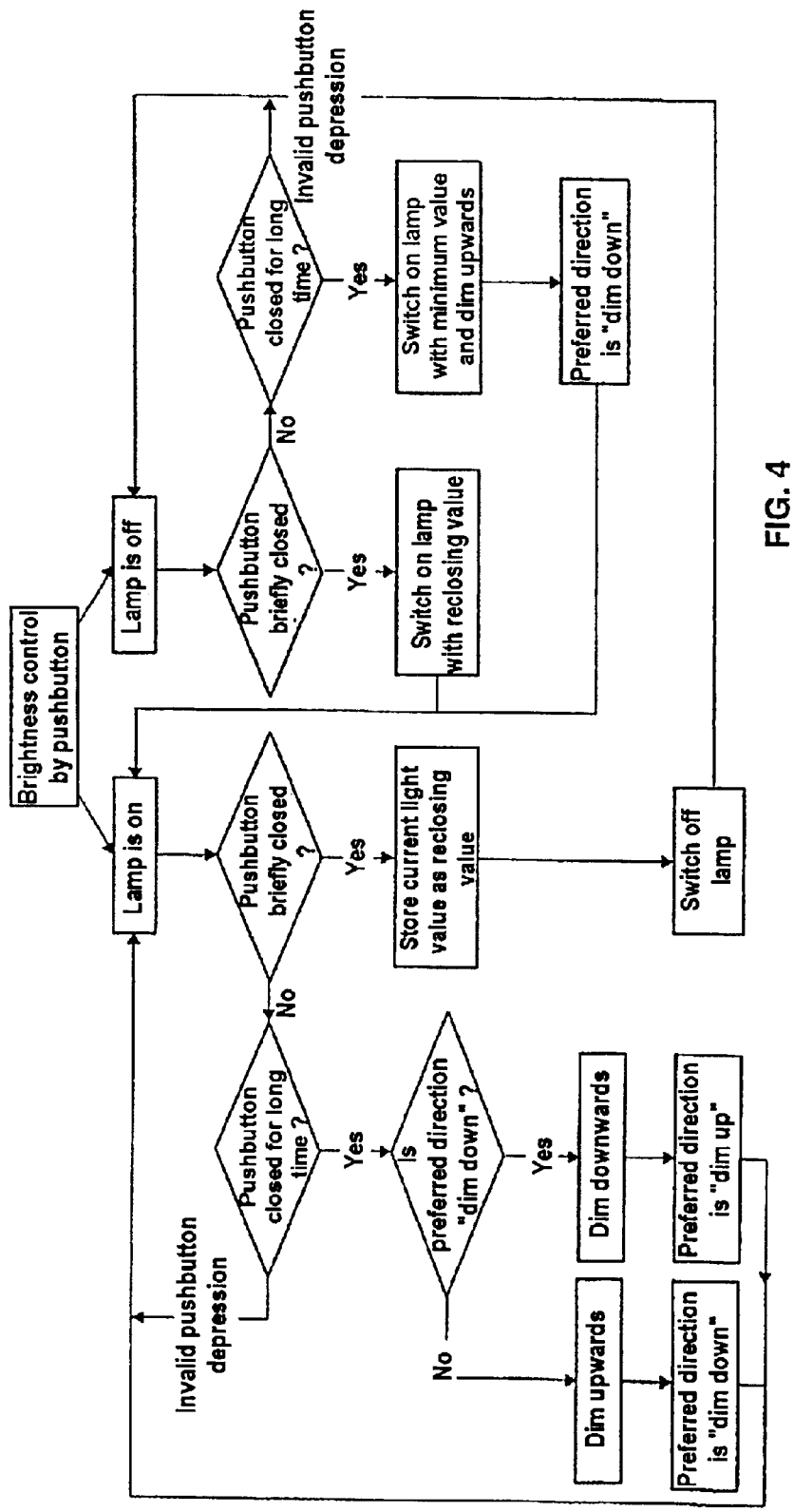
Figure 5:
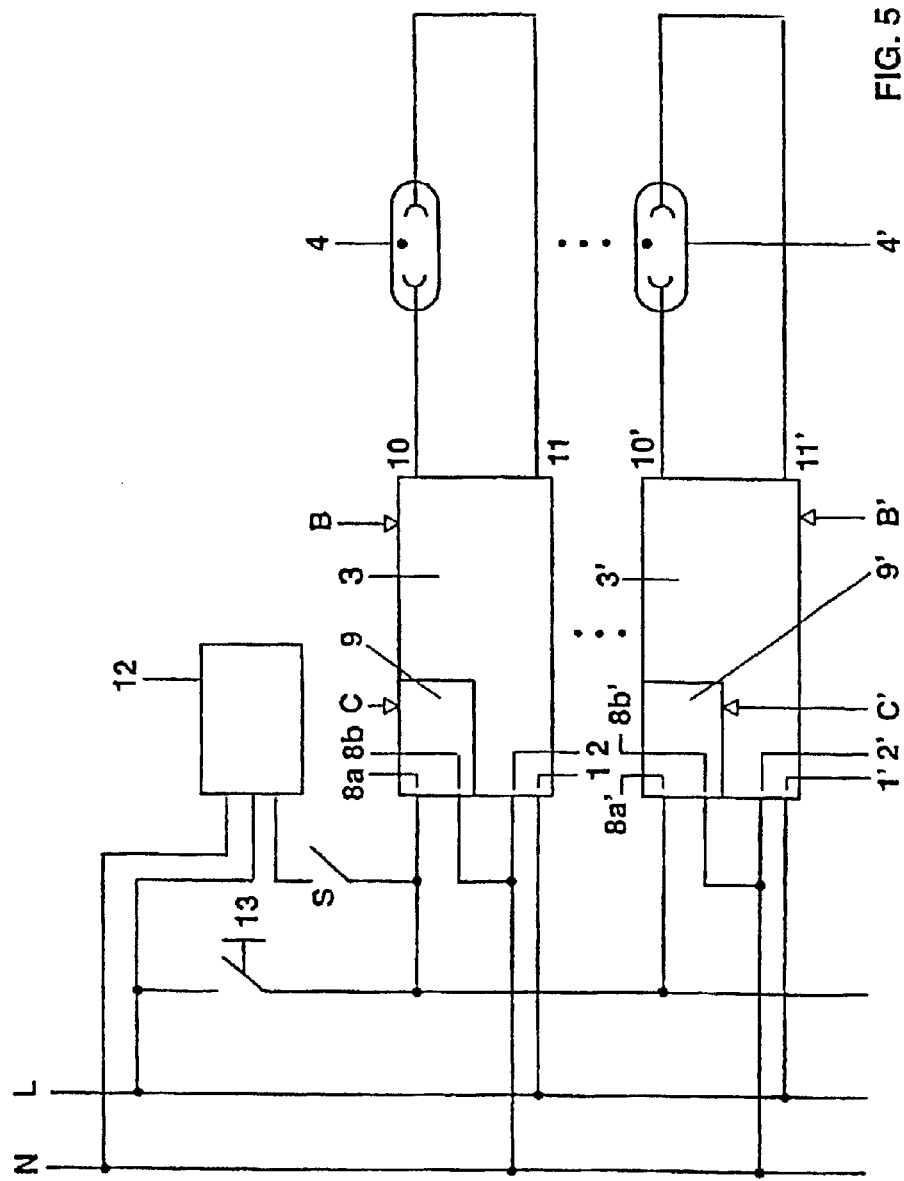

The invention is explained below in more detail with the aid of a preferred exemplary embodiment. In the drawing:

FIG. 1 shows a schematic of a lighting system having operating devices according to the invention and a central control device working with the aid of digital control signals, FIG. 2 shows a schematic of a lighting system having operating devices according to the invention and a central control device, working with the aid of analog control signals, comprising a single pushbutton and a constant light regulation device, FIG. 3 shows a flowchart that illustrates the method according to the invention, in particular the change between the two operating modes, FIG. 4 shows a flowchart for illustrating the analog control of the operating devices by means of a single pushbutton, and FIG. 5 shows a schematic of a lighting system having operating devices according to the invention and a central control device, working with the aid of analog control signals, comprising a single pushbutton and a motion detector.

V. BEST MODE FOR CARRYING OUT THE INVENTION

Illustrated schematically in FIGS. 1 and 2 in each case is a lighting system having a multiplicity of operating devices B, B' according to the invention for electric lamps 4, 4'. The operating device B according to the invention has electric terminals 1, 2 for supplying power to the operating device, operating means 3 for at least one electric lamp 4, electric terminals 10, 11 for the at least one lamp 4, a control signal input with two terminals 8a, 8b that serves for controlling the operating means 3, and evaluating means 9 that detect and evaluate the control signals at the control signal input 8. The operating means 3 of the operating device essentially comprise an externally controlled half-bridge inverter whose load circuit is designed as a series resonant circuit and provided with the terminals 10, 11 for at least one electric lamp 4. The evaluating means 9 are connected upstream of the externally controlled half-bridge inverter. They essentially comprise a programmable microcontroller that evaluates under program control the control signals present at the control signal input 8a, 8b and converts them into corresponding signals for external control of the half-bridge inverter. The external control of the half-bridge inverter is carried out, for example, with the aid of an integrated circuit designed specifically therefor and which generates, for example, pulse-width-modulated signals for controlling the switching transistors of the half-bridge inverter. The programmable microcontroller of the evaluating means 9 in this case takes over driving the integrated circuit of the half-bridge inverter. The evaluating means 9 are coupled to the terminals 8a, 8b of the control signal input, for example via an optocoupler and an overvoltage protection circuit.

The evaluating means 9 and the control signal input with its terminals 8a, 8b form a device C that need not necessarily be a component of the operating device B but can also be designed as a separate assembly and can also, in particular, be arranged outside the housing of the operating device B. In this case, each device C is coupled to the operating device B assigned to it with the aid of suitable signal transmitting means, for example by interconnecting cables.

In accordance with the method according to the invention, the operating devices B, B' or the devices C, C' can optionally be driven at their control signal input 8a, 8b, 8a', 8b' with the aid of digital or analog control signals. The digital drive of the operating devices B, B' or the devices C, C' is illustrated schematically in FIG. 1. For the digital drive, the terminals 8a, 8b, 8a', 8b' of the control signal inputs of the operating devices B, B' or the devices C, C' are connected to a central, digital external control device 7 that is provided with control elements for controlling the lighting functions. The electric terminals 1, 2, 1', 2' of the operating devices 3, 3' are connected to the supply voltage lines N, L for the purpose of power supply. The control device 7 generates digital control signals that have a prescribed format. Each digital control signal comprises, for example, 16 bits. It begins with a start bit and ends with a stop bit. The start bit is followed by the digitally coded operating address of the operating device B, B' to be driven, or of the group of operating devices that is to be driven, and one or more digitally coded control commands which change the operating state of the operating device or the operating devices and the lamps connected thereto. In particular, the lamps 4, 4' are switched on and off and dimmed by means of the control commands. The evaluating means 9, 9' of each operating device B, B' test the control signal present at the terminals 8a, 8b, 8a', 8b' of the control signal inputs as to whether a valid digital control signal is present, that is to say whether the control signal has the prescribed format for digital control signals. In order to detect and to evaluate digital input signals, a first threshold value, which defines a minimum voltage value that is still rated as logic level "high" or "1", and a second threshold value, which defines a maximum voltage value that is still rated as logic level "low" or "0" are stored in the evaluating means 9, 9'. If a valid digital control signal is present at the control signal inputs 8a, 8b, 8a', 8b', the corresponding operating devices B, B' remain in the first operating mode of "digital drive", or change to this operating mode. The evaluating means 9, 9' of the operating devices B, B' use a microcontroller working under program control to generate signals, corresponding to the digital control commands, for controlling the operating means 3, 3'. With each reception of a control signal at the control signal inputs 8a, 8b, 8a', 8b', a renewed test is made as to whether the control signal corresponds to the prescribed format for digital control signals. If the result of checking the control signal is that the latter does not correspond to the prescribed format for digital control signals, a test is made as to whether the control signal present at the control signal inputs 8a, 8b, 8a', 8b' corresponds to the prescribed format for analog control signals. If the control signal corresponds to the prescribed format for analog control signals, the operating devices B, B' change into the second operating mode of "analog drive". The change between the two operating modes of "digital drive" and "analog drive" is therefore performed automatically, that is to say under program control, by the evaluating means 9, 9' of the respective operating device B, B'. If neither a valid digital control signal nor a valid analog control signal is present, the signal present at the control signal input is ignored, that is to say, in particular, the operating devices B, B' retain their current mode of operation. The flowchart illustrated in FIG. 3 explains the change between the two above named operating modes.

The distinction between digital and analog control signals is made by the evaluating means 9, 9'. For this purpose, the signal edges, detected within a prescribed time interval, of the control signal are counted, and the number that is determined of detected signal edges is compared with prescribed desired values for the digital and analog drive, respectively. Since digital and analog control signals have very different frequencies, this ensures a reliable distinction between the two types of signal. Moreover, it is also possible to distinguish in this way between valid and invalid control signals. In the operating mode of "analog drive", the evaluating means 9, 9' of each operating device B, B' use their microcontroller operating under program control to generate signals, corresponding to the analog control signal, for controlling the operating means 3, 3' of the respective operating device B, B'. The analog drive of the operating devices B, B' of a lighting system with the aid of a single pushbutton 13 and a constant light regulation device is illustrated schematically in FIG. 2. The analog control, illustrated in the flowchart of FIG. 4, of the operating devices B, B' is explained in more detail below.

As already described above, the operating devices B, B' are operated using system voltage. For this purpose, the electric terminals 1, 2, 1', 2' of the operating devices B, B' are connected to the supply voltage lines N, L. The analog control signals for the device C, C' or for the operating devices B, B' are generated from the AC supply voltage. In order to generate the analog control signals, the supply voltage line N is additionally connected to the terminal 8b, 8b' of the control signal input of each operating device B, B' or each device C, C', while the other supply voltage line L is additionally connected via the pushbutton 13 to the other terminal 8a, 8a' of the control signal input of each operating device B, B' or each device C, C'. The analog control signals are obtained from the AC supply voltage, if appropriate after voltage division upon actuating the pushbutton 13. The analog control signals are therefore periodic AC voltages that are applied briefly to the control signal input by actuating the pushbutton 13. The actuation of the pushbutton 13 is detected by the evaluating means 9, 9'. In order for the evaluating means 9, 9' to be able to detect and evaluate the analog control signals, their peak value is selected such that it exceeds a first threshold value, that in the case of digital control signals, defines the minimum voltage value still valid as logic level "high" or "1". Moreover, the analog control signals are designed such that at least once per period they undershoot a second threshold value that, in the case of digital signals, defines the maximum voltage value still valid as logic level "low" or "0". It is thus ensured that the evaluating means 9, 9' detect changes in the analog control signal, in particular the actuation of the pushbutton 13. The precise sequence of the control of the operating devices B, B' or the devices C, C' by means of analog control signals is illustrated in the flowchart of FIG. 4.

If the pushbutton 13 is briefly closed with the lamps 4, 4' switched off, the lamps 4, 4' are switched on at the reclosing value, stored in the operating device B, B', for their dimming level or brightness level. If the pushbutton 13 is closed for a lengthy time with the lamps 4, 4' switched off, the lamps 4, 4' are switched on at minimum brightness and their brightness is increased as long as the pushbutton 13 is closed, or until the maximum brightness is reached. Upon renewed actuation of the pushbutton 13, the direction of brightness control is reversed, that is to say a changeover occurs from "raising" to "lowering" the brightness. The lamps 4, 4' remain in the switched-off state in the event of an invalid actuation of the pushbutton 13.

If the pushbutton 13 is briefly closed with the lamps 4, 4' switched on, the current brightness value of the lamps 4, 4' is stored as reclosing value, and the lamps 4, 4' are subsequently switched off. If the pushbutton 13 is closed for a lengthy time with the lamps 4, 4' switched on, and if the direction of brightness regulation is set on "lowering", the brightness of the lamps 4, 4' is reduced for as long as the pushbutton 13 remains closed, or until the lamps 4, 4' have reached their minimum brightness level. Upon renewed actuation of the pushbutton 13, the direction of the brightness regulation is set to "raising". If the pushbutton 13 is closed with the lamps 4, 4' switched on, and if the direction of brightness regulation is set on "raising", the brightness of the lamps 4, 4' is raised for as long as the pushbutton 13 remains closed or until the lamps 4, 4' have reached their maximum brightness level. Upon renewed activation of the pushbutton 13, the direction of the brightness regulation is set to "lowering". In the case of an invalid actuation of the pushbutton 13, the lamps 4, 4' remain in the switched-on state.

The lighting system illustrated schematically in FIG. 2 additionally has a constant light regulation device which is fitted with a light sensor 12 and controls the brightness of the lamps 4, 4' as a function of the ambient light so as always to ensure a constant level of lighting or brightness. The output circuit of the sensor 12 of the constant light regulation device is designed such that no sensor signal is present at the control signal inputs 8a, 8b, 8a', 8b' of the operating devices B, B' or the devices C, C' as long as the pushbutton 13 is closed. After each change in the brightness value owing to an actuation of the pushbutton 13, the frequency of the sensor AC voltage is measured and used as new desired value by the operating devices B, B' for the purpose of brightness regulation of the lamps 4, 4'. If the actual value of the frequency of the sensor AC voltage differs from the current desired value, the operating devices B, B' correct their brightness level until the actual value of the frequency of the sensor AC voltage again corresponds to the desired value. The frequency of the sensor signal, generated by the constant light regulation device, at the control inputs 8a, 8b, 8a', 8b' is, for example, between 200 Hz and 400 Hz. The frequency of the system AC voltage, and thus also the frequency of the control signals that can be influenced by the pushbutton 13, is outside the frequency range of the sensor AC voltage.

The invention is not limited to the exemplary embodiments explained in detail above. A further exemplary embodiment of the invention with analog drive by a pushbutton 13 is illustrated in FIG. 5. This exemplary embodiment is largely identical to the exemplary embodiment of the invention illustrated in FIG. 2. The sole difference consists in the assembly 12. In FIG. 5, the reference 12 denotes the combination of a light sensor and a presence detector that detects the presence of a person in the region of the illuminating means and switches on or off appropriately. The presence detector or light sensor can be activated or deactivated via the switch S. The constant light regulation device also works here as has already been described above with the aid of FIG. 4. Consequently only the functioning of the presence detector is explained in more detail below.

The sensor of the presence detector, which is designed as a motion sensor, for example, supplies an AC voltage signal of fixed frequency directly after detection of the presence of a person, the frequency of this AC voltage signal being outside the frequency of the digital drive or of the analog pushbutton drive and outside the frequency range of the light sensor. A timer for a settable delay interval is activated in the motion sensor of the presence detector with the output of the above named AC voltage signal. The timer is reset to its initial value with each movement. As long as the delay interval has not expired, the sensor periodically continues to supply an AC voltage signal. The brightness value required for the constant light regulation can be received between the AC voltage signals of the presence detector. If an operating device receives no AC voltage signal from the presence detector over a specific time interval, the operating device sets the brightness to the lowest value and finally switches off.

Another possibility for controlling the presence detector consists in not communicating any AC voltage signals from the presence detector within the above named delay interval. Rather, instead of this at the end of the delay interval the presence detector supplies an AC voltage signal of changed frequency that causes the operating device to set the lowest brightness value and switch off. In all cases, the pushbutton signal has priority over the control signals of the light sensor or presence detector.

It may be stressed here once more that all control devices, whether pushbutton 13 or light sensor 12 or presence detector or digital control device 7, use the same control signal input 8a, 8b of the operating device. The operating device B automatically detects which type of drive is present and evaluates the control signals correspondingly. Moreover, the light sensor 12 or the presence detector 12 reports automatically to the operating device by means of its AC voltage signal. There is no need to restart the system in order to detect the newly connected control devices. The light sensor 12 or presence detector 12 can even be switched off temporarily by means of the switch S. There is no need even then to restart the system in order to detect the connected sensors.

What is claimed is:

1. A lighting system, comprising:

an electric lamp (4);

an operating device (B), comprising:

electric terminals (1, 2, 10, 11) coupled to an AC voltage source (N, L) and the electric lamp (4); and operating means (3) coupled to the electric terminals (1, 2, 10, 11) and operable to supply power to the electric lamp (4);

a control device (7) coupled to the operating device (B) and operable to provide a control signal to the operating device (B) for controlling the power supplied to the electric lamp (4) by the operating device (B); and wherein the operating device (B) further comprises:

a device (C), comprising:

a control signal input (8a, 8b) for receiving the control signal provided by the control device (7); and evaluating means (9) coupled to the control signal input (8a, 8b) and operable to: (i) evaluate whether the control signal is an analog signal or a digital signal; and (ii) control the operating means (3) and the power supplied to the electric lamp (4) in dependence on the control signal.

2. The lighting system of claim 1, wherein the evaluating means (9) comprises a program-controlled microcontroller.

3. The lighting system of claim 1, wherein the control device (7) comprises at least one of:

a pushbutton;

a light sensor;

a presence detector; and a digital control device.

4. The lighting system of claim 1, wherein the control device (7) comprises a combination of a light sensor and a presence detector.

5. The lighting system of claim 1, wherein the evaluating means (9) is further operable to: (i) determine whether the control signal is a valid analog signal or a valid digital signal; and (ii) disregard the control signal if it is neither a valid analog signal nor a valid digital signal.

6. The lighting system of claim 1, wherein:

the control device (7) is a pushbutton;

an analog control signal is generated is response to depression of the pushbutton; and the analog control signal generated in response to depression of the pushbutton causes the operating means (3) to adjust the power supplied to the electric lamp (4).

* * * * *